United States Patent Office 3,564,605
Patented Feb. 16, 1971

3,564,605
BENZOFURAN CARBAMATES AND METHOD FOR CONTROLLING ARTHROPODA NEMATODA
William G. Scharpf, Rocktown, N.J., assignor to FMC Corporation, New York, N.Y., a corporation of Delaware
No Drawing. Filed Oct. 14, 1964, Ser. No. 403,912
Int. Cl. A01n 9/28; C07d 5/42
U.S. Cl. 424—285
14 Claims

ABSTRACT OF THE DISCLOSURE

Benzofuranyl N-unsubstituted and N-hydrocarbon substituted carbamates in which the carbamate is located on the benzene moiety are useful as pesticides.

---

This invention relates to new chemical compounds and their preparation, to pesticidal compositions containing these new compounds, and to their use to control Arthropoda and Nematoda. More particularly, this invention relates to certain benzofuranyl carbamates as novel and effective pesticides.

The compounds of this invention, and their numbering system, are represented by the general formula:

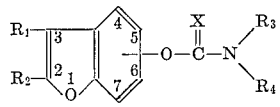

where $R_1$ and $R_2$ are either hydrogen or lower alkyl, $R_3$ and $R_4$ are each hydrogen or lower alkyl, lower alkenyl, or lower alkynyl; and X is oxygen or sulfur. These compounds may be unsubstituted in the benzene ring, or may contain one or more substituents, such as lower alkyl, lower alkenyl, halogen, haloalkyl, nitro, amino or substituted amino, cyano, alkoxycarbonyl, acyl, alkoxy, alkylthio, and the like, as well as additional carbamate groupings. Compounds of the above-defined class exhibit outstanding pesticidal activity, including activity against Nematoda, and against Arthropoda such as Coleoptera (beetles), Hemiptera (true bugs), Homoptera (aphids), Acarina (mites), Diptera (flies and wasps), Lepidoptera (moths and butterflies) and Blattaria (roaches). Certain preferred pesticidal compounds include the group wherein $R_1$ and $R_2$ are each hydrogen or methyl, X is oxygen, $R_3$ is hydrogen and $R_4$ is alkyl, alkenyl, or alkynyl of one to three carbon atoms; and the carbamate moiety joins the benzofuran nucleus at the 4- or the 7-position.

The preparation and pesticidal properties of typical compounds of this invention are illustrated in the following examples, which are provided by way of illustration and not of limitation. All parts are by weight where not otherwise indicated, and all temperatures are in degrees centigrade.

EXAMPLE 1

Preparation and pesticidal properties of 7-benzofuranyl N-methylcarbamate

The intermediate 7-benzofuranol was prepared from 2-hydroxy-m-anisaldehyde by the following series of reactions: To a refluxing solution of 26.5 g. of 2-hydroxy-m-anisaldehyde and 28.7 g. of ethyl bromoacetate in 100 ml. of absolute ethanol was added dropwise a solution prepared by dissolving 7.5 g. of sodium in 200 ml. of absolute ethanol. The mixture was refluxed an additional 3.5 hours and stirred overnight. A solution of 7.5 g. of potassium hydroxide in 100 ml. of water was added and the ethanol was removed by distillation. The residue was cooled, acidified with 6 N hydrochloric acid and allowed to stand overnight. The precipitate was isolated by filtration, and dissolved in sodium bicarbonate solution. This solution was washed with ether and acidified to yield 18.3 g. of crude 7-methoxy-2-benzofurancarboxylic acid, melting at 209–11°. A mixture of 10 g. of this acid and 185 ml. of chlorobenzene was stirred and warmed on a steam bath as 26 g. of anhydrous aluminum chloride was added portionwise. After 0.5 hour heating, the solution was poured onto ice and dilute hydrochloric acid. The chlorobenzene was removed by steam distillation and the product was extracted with ethyl acetate. The organic solution was dried over magnesium sulfate and concentrated to dryness under vacuum to yield 7.5 g. of 7-hydroxy-2-benzofurancarboxylic acid melting at 192–7°. The crude solid was recrystallized from water to melt at 218–20°. A mixture of 11.3 g. of this recrystallized product, 76 g. of refined quinoline and 1.5 g. of copper powder was heated at 120–5° until evolution of carbon dioxide ceased. The cooled mixture was diluted with 250 ml. of ether and filtered. The filtrate was washed with three 150-ml. portions of 3 N hydrochloric acid and with a 200-ml. portion of water. It was dried over magnesium sulfate and filtered. After removal of the ether and quinoline, a yield of 3 g. of 7-benzofuranol, boiling at 72–8° (0.2 mm.), was obtained.

This phenol was esterified by the following procedure: To a mixture of 3.1 g. of 7-benzofuranol and 1.7 g. of methyl isocyanate was added 4 drops of triethylamine. An immediate exothermic reaction took place. The mixture was heated at 45–50° for 24 hours and poured into water. The water was extracted with ether, the ether solution dried and concentrated to dryness under vacuum to yield 3.4 g. of crude 7-benzofuranyl N-methylcarbamate melting at 137–8°. This compound was recrystallized from benzene.

Analysis.—Calc'd for $C_{10}H_9NO_3$ (percent): C, 62.82; H, 4.71; N, 7.33. Found (percent): C, 62.62; H, 4.89; N, 7.58.

Insecticidal activity was measured as follows: The compound 7-benzofuranyl N-methylcarbamate was dissolved to form a 1% solution in acetone, which was then diluted with water to provide a concentration of 1250 p.p.m. of active ingredient. Test insects and techniques were as follows: The activities against Mexican bean beetles (Epilachna varivestis Mulsant) and southern armyworms (Prodenia eridania Cramer) were evaluated by dipping the leaves of pinto bean plants into the test solution, and infesting the leaves with the test insects; and the activity against the milkweed bug (Oncopeltus fasciatus Dallas) was evaluated by spraying the test solution into glass dishes containing the insects. After seventy-two hours of exposure of the test insects as described above, the present kill was determined. Results presented below and in the succeeding examples are each an average of two or more replicates.

The procedure followed for evaluation of activity against houseflies was as follows: One microliter of a solution of 2000 mg. of the test compound in 100 ml. of acetone was applied to the body of each of 35 to 45 three- to four-day-old houseflies (Musca domestica). After 24 hours, the percent kill was determined by physical counting of the dead and living flies.

Nematode control was measured as follows:

A nematode-infested soil was prepared by mixing about 1000 larvae of the root-knot nematode (Meloidogyne incognita var. acrita) into a liter of sandy-loam soil. Into this infested soil was blended sufficient test compound, formulated as a 5% dust on attapulgite clay, to give a concentration of 100 p.p.m. This mixture was held in the greenhouse in a moist condition for four to seven days, then young tomato plants were planted in the soil and allowed to grow for four to six weeks. When appropriate growth was attained, the roots of the tomato plants were washed free of soil and the degree of infestation evaluated in comparison with a plant grown in nematode-infested soil which had received no chemical treatment.

Employing the appropriate test procedures, the compound 7-benzofuranyl N-methylcarbamate exhibited 100% kill of the Mexican bean beetle, 100% kill of the milkweed bug, and 100% kill of houseflies.

EXAMPLE 2

Preparation and pesticidal properties of 7-benzofuranyl N,N-dimethylcarbamate

One gram of sodium was dissolved in 30 ml. of methanol and 2.5 g. of 7-benzofuranol, prepared as in Example 1, was added. The mixture was swirled occasionally for one hour and concentrated to dryness under vacuum. Fifty ml. of 1,2-dimethoxyethane and 2 g. of dimethylcarbamoyl chloride were added, the mixture stirred for 48 hours, and filtered. The filtrate was concentrated under vacuum to yield crude 7-benzofuranyl N,N-dimethylcarbamate, a high boiling liquid with a boiling point above 200° at 0.1 mm.

Following the test procedure described for the compound of Example 1, the compound 7-benzofuranyl N,N-dimethylcarbamate exhibited 100% kill of houseflies.

EXAMPLE 3

Preparation and pesticidal properties of 6-benzofuranyl N-methylcarbamate

To a solution of 7.2 g. of 6-benzofuranol (a known compound, reported by J. S. H. Davies and T. Deegan, J. Chem. Soc. 1950, 3206) and 2 drops triethylamine in 50 ml. of dry ether, 4.6 g. of methyl isocyanate was added dropwise. The solution was refluxed for 18 hours, cooled and filtered to yield 10.3 g. of 6-benzofuranyl N-methylcarbamate melting at 101–4°. Recrystallization from ethanol raised the melting point to 109–10°.

Analysis.—Calc'd for $C_{10}H_9NO_3$ (percent): C, 62.82; H, 4.74; N, 7.33. Found (percent): C, 62.94; H, 5.02; N, 7.33.

Employing the test procedure described for the compound of Example 1, the compound 6-benzofuranyl N-methylcarbamate exhibited 100% kill of the Mexican bean beetle and 100% kill of houseflies.

EXAMPLE 4

Preparation and pesticidal properties of 6-benzofuranyl N,N-dimethylcarbamate

A solution of 10.0 g. of 6-benzofuranol in 25 ml. of dry 1,2-dimethoxyethane was added dropwise to a slurry of 3.9 g. of a 49% dipersion of sodium hydride in mineral oil and 80 ml. of dry 1,2-dimethoxyethane. The mixture was stirred for 0.5 hour after the vigorous evolution of hydrogen had stopped, then 8.6 g. of freshly distilled dimethycarbamoyl chloride was added dropwise. After stirring for 18 hours at room temperature, the precipitated sodium chloride was removed by filtration and the filtrate concentrated under vacuum. The residual oil was washed several times with cold hexane, taken up in ether and washed with cold 5% sodium hydroxide solution and with water. Evaporation of the ether left a yellow oil which was distilled through a 15 cm. Vigreux column to yield 10.5 g. of 6-benzofuranyl N,N-dimethylcarbamate boiling at 132° (0.75 mm.).

Analysis.—Calc'd for $C_{11}H_{11}NO_3$ (percent): C, 64.38; H, 5.40; N, 6.83. Found (percent): C, 64.39; H, 5.40; N, 7.11.

Folowing the procedure described in Example 1, the compound 6-benzofuranyl N,N-dimethylcarbamate exhibited 100% kill of houseflies.

EXAMPLE 5

Preparation and pesticidal properties of 5-benzofuranyl N-methylcarbamate

Following the procedure described in Example 3, 9.0 g. of 5-benzofuranol was reacted with 5.7 g. of methyl isocyanate to yield 8 g. of crude 5-benzofuranyl N-methylcarbamate melting at 85–9°. Recrystallization from methylcyclohexane gave 5.8 g. of white plates melting at 92.5–4°.

Analysis.—Calc'd for $C_{10}H_9NO_3$ (percent): C, 62.82; H, 4.74; N, 7.33. Found (percent): C, 62.60; H, 4.74; N, 7.41.

Employing the techniques described for the compound of Example 1, the compound 5-benzofuranyl N-methylcarbamate exhibited 95% kill of the Mexican bean beetle.

EXAMPLE 6

Preparation and pesticidal properties of 4-benzofuranyl N-methylcarbamate

A solution of 4.0 g. of 4-benzofuranol (a known compound described by T. Reichstein and R. Hirt, Helv. Chim. Acta 16, 121 (1933)) in 10 ml. of ether was treated with 2.0 g. of methyl isocyanate and with 1 drop of triethylamine. The mixture was allowed to stand for several hours and filtered to yield 5.0 g. of 4-benzofuranyl N-methylcarbamate melting at 136.0–7.5°. An analytical sample was recrystallized from carbon tetrachloride to melt at 137–8°. The structure of this compound was confirmed by infrared analysis.

Analysis.—Calc'd for $C_{10}H_9NO_3$ (percent): N, 7.33. Found (percent): N, 7.59.

Following the test procedures of Example 1, the compound 4-benzofuranyl N-methylcarbamate exhibited 100% kill of the Mexican bean beetle, the milkweed bug, and the southern armyworm; 100% kill of houseflies; and complete control of the root-knot nematode.

EXAMPLE 7

Preparation and pesticidal properties of 2-methyl-4-benzofuranyl N-methylcarbamate The intermediate 2-methyl-4-benzofuranol was prepared from 5-methyl-2-furaldehyde as follows: A solution of 56 g. of sodium succinate in 62 g. of acetic anhydride was maintained at a temperature of 140° as a solution of 19 g. of 5-methyl-2-furaldehyde in 20 ml. of acetic anhydride was added dropwise over a period of three hours. The mixture was stirred at 140° for an additional hour, then poured into 300 ml. of hot water. The aqueous mixture was acidified with hydrochloric acid and extracted with ether. The ether layer was washed with sodium bicarbonate solution and with water until neutral and dried over magnesium sulfate. After removal of the ether, 16 g. of potassium hydroxide and 150 ml. of methanol were added to the residue. The resulting solution was refluxed for 1.5 hours, cooled, acidified and extracted with ether. The ether layer was washed with 10% sodium hydroxide solution, with sodium bicarbonate solution, and with water. The alkaline extracts were combined, neutralized, and extracted with ether. This ether solution was dried over magnesium sulfate, the ether was removed and the residue distilled to yield 1.5 g. of 2-methyl-4-benzofuranol boiling at 84–6° (0.30 mm.).

This intermediate phenol was esterified as follows: The addition of three drops of triethylamine to a mixture of 1 g. of 2-methyl-4-benzofuranol and 10 ml. of methyl isocyanate caused an exothermic reaction in which a white solid was formed. The mixture was allowed to stand overnight, poured into water, and the crude product isolated by filtration. After washing with water and drying, a yield of 1.5 g. of 2-methyl-4-benzofuranyl N-methylcarbamate, melting at 152–5°, was obtained. Recrystallization from toluene gave a material melting at 153–5°.

Analysis.—Calc'd for $C_{11}H_{11}NO_3$ (percent): C, 64.38; H, 5.40; N, 6.83. Found (percent): C, 64.24; H, 5.49; N, 7.11.

Employing the procedures described in Example 1, the compound 2-methyl-4-benzofuranyl N-methylcarbamate exhibited 100% kill of the Mexican bean beetle and 70% kill of the milkweed bug.

EXAMPLE 8

Preparation and pesticidal properties of 3-methyl-4-benzofuranyl N-methylcarbamate The intermediate 3 - methyl - 4 - benzofuranol was prepared according to the method of Whalley (J. Chem. Soc. 1951, 3234) as follows: Reaction of 30 g. of 2'6'-dihydroxyacetophenone, 33.4 g. of ethyl bromoacetate, and 27.6 g. of potassium carbonate in 350 ml. of dry acetone gave 37.3 g. of ethyl (2 - acetyl - 3 - hydroxyphenoxy)acetate, M.P. 85–6° (from ethanol), lit. M.P. 74–5°. Thirty-four grams of this ester was saponified with 340 ml. of 2 N sodium hydroxide, and acidified to give 27.1 g. of the corresponding acid, M.P. 193.0–4.5°. This acid (27.0 g.) was cyclized with 216 ml. of acetic anhydride and 67.5 g. of sodium acetate to give 25 g. of crude 4 - hydroxy - 3 - methylbenzofuran - 2 - carboxylic acid. Twenty grams of this acid was decarboxylated to give 12.9 g. of 3 - methyl - 4 - benzofuranol, M.P. 108–110. A small sample recrystallized from water melted at 110–11°.

Five grams of this phenol was reacted with 2.1 g. of methyl isocyanate according to the procedure described in Example 6 to yield 5.5 g. of 3 - methyl - 4 - benzofuranyl N - methylcarbamate melting at 113–5°. Recrystallization from methylcyclohexane and from n - butyl ether gave a sample melting at 113.5–5.0°. The structure of this compound was confirmed by infrared analysis.

*Analysis.*—Calc'd for $C_{11}H_{11}NO_3$ (percent): N, 6.83. Found (percent): N, 6.89.

Employing the test procedures described in Example 1, the compound 3 - methyl - 4 - benzofuranyl N - methylcarbamate exhibited 100% kill of the Mexican bean beetle, 100% kill of the milkweed bug, and 95% kill of the southern armyworm.

EXAMPLE 9

Systemic insecticidal activity

These compounds possess useful systemic insecticidal activity. This may be illustrated as follows: A 1% solution of 4 - benzofuranyl N - methylcarbamate in acetone was diluted with water to a concentration of 156 p.p.m. of active ingredient. The roots of pinto bean plants at the bifoliate stage of growth were excised, and the plant stems suspended in the solution of the test compounds. After three days of immersion of the plant stems, the leaves of the plant were infested with the test insects. Three days after infestation, counts of the percent kill were made. This compound effected 100% kill of the Mexican bean beetle, 100% kill of the pea aphid, and 95% kill of the southern armyworm.

Following the test procedure described above 3 - methly-4-benzofuranyl N - methylcarbamate effected 100% kill of the Mexican bean bettle and the southern armyworm.

These results illustrate excellent systemic activity.

Other pesticidal compounds of the class described herein may be prepared by adaptation of the synthetic procedures illustrated above, as well as by other procedures. Generally useful methods for the preparation of these compounds are discussed below. Many of these reaction steps are novel, in addition to the novelty of the overall reaction sequences.

The carbamates of the invention may be prepared by esterification of the appropriate benzofuranol, or by the dehydrogenation of the corresponding 2,3 - dihydrobenzofuranyl carbamate.

Several of the intermediate benzofuranols are natural products, and many synthetic methods for the preparation of benzofuranols have been reported in the literature. A number of these methods are reviewed in an article by E. Bisagni and R. Royer (Bul. Soc. Chim. (France) 1962, 925).

A useful method of synthesis of benzofuranols involves the treatment of a furan compound with a reagent which will react with it and cyclize to form the aromatic ring. For example, 2 - furaldehyde may be reacted with sodium succinate, or levulinic acid, by known procedures, to give 4 - benzofuranol and 6 - acetyl - 4 - benzofuranol.

An alternative method for the production of benzofuranols involves the treatment of a phenol with a reagent which cyclizes to form the furan ring. For example, (hydroxyphenoxy)acetic acid derivatives may be treated with reagents such as acetic anhydride and sodium acetate, effecting cyclization to a hydroxy - 3(2H) - benzofuranone. This benzofuranone may be converted to an alcohol by any of the usual methods for reduction of ketones or by reaction with a Grignard reagent such as an alkyl magnesium halide, following established procedures for the Grignard reaction. This dihydrobenzofurandiol may then be dehydrated to give a benzofuranol. This method is particularly useful in the preparation of 6-benzofuranols.

Alternatively, a methoxyhydroxybenzaldehyde may be treated with a haloacetic acid or ester, and the substituted 2 - benzofurancarboxylic acid or ester formed in this reaction is demethylated and decarboxylated to give the corresponding benzofuranol. This method is useful to prepare 7 - benzofuranol, as described in Example 1 herein, but it is not limited to the preparation of 7 - benzofuranols; the 4-, 5-, and 6 - benzofuranols may also be prepared by the same general procedure.

In a somewhat similar method, resorcinol and its derivatives may be treated with a 2-haloacetoacetic acid ester, and the intermediate benzofurancarboxylic acid decarboxylated to form a 3 - methyl - 6 - benzofuranol. In addition, by reaction of a dihydroxybenzene with a hydroxyacetone, a 2 - methylbenzofuranol is obtained. Benzofuranols may also be obtained by dehydrogenation of the corresponding 2,3,-dihydrobenzofuranols.

These reactions are of course not limited to the specific compounds mentioned, but are readily adapted, by obvious modifications, to produce all the compounds of this invention. Through the use of the appropriate starting material or reagent, benzofuranols with the desired substituent or substituents on the aromatic and/or heterocyclic ring may be obtained.

To prepare the final products for pesticidal use herein, the benzofuranols may be esterified by standard procedures to give the desired carbamates. Such procedures for the preparation of carbamate esters are described by Wagner and Zook, "Synthetic Organic Chemistry," Chp. 23, John Wiley & Sons, New York, 1953. Reagents such as alkyl isocyanates or isothiocyanates, and alkyl-or dialkylcarbamoyl or thiocarbamoyl halides, will produce the carbamate ester directly. Alternatively, the phenolic hydroxyl may be converted to a chloroformate or chlorothioformate ester by reaction with phosgene or thiophosgene, and this ester subsequently reacted with a mono- or dialkylamine to form the desired carbamate.

Employing procedures such as those described and illustrated hereinabove, pesticidal compounds may be prepared wherein, for example, the carbamate ester may be either N-monosubstituted or N,N-disubstituted with substituents including methyl, ethyl, vinyl, ethynyl, straight and branched chain propyl and butyl including the unsaturated groups propenyl and propynyl, butenyl and butynyl; mixed substituents on the carbamate nitrogen; and substituted derivatives thereof; and the thio analogs of the above, such as N-methylthiocarbamate, N-ethyl-N-isopropylthiocarbamate; and the like. Modifications in the benzofuran nucleus may also be made, as previously discussed; thus, the benzene and/or the furan ring may be substituted with one or more alkyl groups, such as methyl, ethyl, isopropyl, and unsaturated aliphatic groups such as chloroallyl and similar compounds, amino and substituted amino groups such as dimethylamino; halogen; alkoxy such as methoxy and isopropoxy; other groups, such as those exemplified by methoxycarbamoyl and acetyl, nitro, methylthio, cyano, and the like; as well as biscarbamates such as 4,7-benzofurandiyl bis (N-methylcarbamate); and a wide variety of other benzofuranyl carbamates which will be apparent from a consideration of the description of the invention herein.

The novel compounds thus obtained may be formulated with the usual additives and extenders in the preparation of pesticidal compositions. The toxicants of this invention, like most pesticidal agents, are generally not applied full strength. They are generally incorporated in any of the adjuvants and carriers normally employed for facilitating the dispersion of active ingredients, recognizing the accepted fact that the formulation and mode of application of a toxicant may affect the activity of the material. These compounds may be applied, for example, as sprays, dusts, granules, or baits, to the area in which pest control is desired, the choice of application varying of course with the type of pest and the environment. Thus, these compounds may be formulated as granules of large particle size, as powdery dusts, as wettable powders, as emulsifiable concentrates, as solutions, and the like.

Dusts are admixtures of the active ingredients with finely divided solids such as talc, attapulgite clay, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about 50 microns. A typical dust formulation useful herein contains 10.0 parts of toxicant, 30.0 parts of bentonite clay and 60.0 parts talc.

The compounds may be made into liquid concentrates by solution or emulsion in suitable liquids, and into solid concentrates by admixture with talc, clays and other known solid carriers used in the pesticide art. The concentrates are compositions containing about 5–50% toxicant and the rest inert material which includes dispersing agents, emulsifying agents, and wetting agents. The concentrates are diluted for practical application, with water or other liquid for aqueous sprays or with additional solid carrier for use as dusts. Typical carriers for solid concentrates (also called wettable powders) include fuller's earth, kaolin clays, silicas, and other highly absorbent, readily wet inorganic diluents. A useful solid concentrate formulation for use herein contains 25.0 parts of toxicant, 72.0 parts of bentonite clay and 1.5 parts each of sodium lignosulfonate and sodium laurylsulfonate as wetting agents.

Useful liquid concentrates include the emulsifiable concentrates, which are homogeneous liquid or paste compositions which are readily dispersed in water or other dispersant, and may consist entirely of the toxicant with a liquid or solid emulsifying agent, or may also contain a liquid carrier, such as xylene, heavy aromatic naphthas, isophorone and other non-volatile organic solvents. For application these concentrates are dispersed in water or other liquid carrier, and normally applied as a spray to the area to be treated.

The concentration of the toxicant in the dilution generally used for control of insect and other pests is normally in the range of about 2% to about 0.001%. Many variations of spraying and dusting compositions in the art may be used, by substituting the compounds of this invention into compositions known or apparent to the art.

Typical wetting, dispersing or emulsifying agents used in pesticidal formulations include, for example, the alkyl and alkylaryl sulfonates and sulfates and their sodium salts, alkylamide sulfonates, including fatty methyl taurides; alkylaryl polyether alcohols; sulfated higher alcohols, polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the pesticidal composition.

Other useful formulations include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used. Baits are generally prepared by mixing liquid or solid concentrates with a suitable food, such as a mixture of cornmeal and sugar.

The pesticidal compositions may be formulated and applied with other active ingredients, including other insecticides, fungicides, nematocides, plant growth regulators, fertilizers, etc. In applying the chemicals it is obvious that an effective amount and concentration of toxicant should be employed.

It is apparent that many modifications may be made in the structure, preparation, formulation and application of the compounds of this invention, without departing from the spirit and scope of the following claims:

I claim:

1. A compound of the formula:

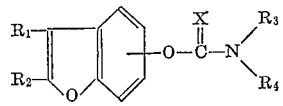

wherein $R_1$ and $R_2$ are each selected from the group consisting of hydrogen and lower alkyl; $R_3$ and $R_4$ are each selected from the group consisting of hydrogen, lower alkyl, lower alkenyl, and lower alkynyl; and X is selected from the group consisting of oxygen and sulfur.

2. A compound of the formula:

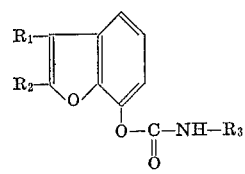

wherein $R_1$ and $R_2$ are each selected from the group consisting of hydrogen and methyl, and $R_3$ is selected from the group consisting of alkyl, alkenyl and alkynyl of one to three carbon atoms.

3. A compound of the formula:

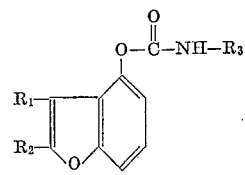

wherein $R_1$ and $R_2$ are each selected from the group consisting of hydrogen and methyl, and $R_3$ is selected from the group consisting of alkyl, alkenyl and alkynyl of one to three carbon atoms.

4. The compound 7-benzofuranyl N-methylcarbamate.
5. The compound 6-benzofuranyl N-methylcarbamate.
6. The compound 4-benzofuranyl N-methylcarbamate.
7. The compound 2-methyl-4-benzofuranyl N-methylcarbamate.
8. The compound 3-methyl-4-benzofuranyl N-methylcarbamate.

9. A pesticide comprising an extender and, as an active toxicant for pests including Arthropoda and Nematoda, an effective amount of a compound of claim 1.

10. A pesticide comprising an extender and, as an active toxicant for pests including Arthropoda and Nematoda, an effective amount of a compound of claim 2.

11. A pesticide comprising an extender and, as an active toxicant for pests including Arthropoda and Nematoda, an effective amount of a compound of claim 3.

12. The method of controlling Arthropoda and Nematoda which comprises subjecting them to effective doses of a compound of claim 1.

13. The method of controlling Arthropoda and Nematoda which comprises subjecting them to effective doses of a compound of claim 2.

14. The method of controlling Arthropoda and Nematoda which comprises subjecting them to effective doses of a compound of claim 3.

References Cited

UNITED STATES PATENTS

| | | | |
|---|---|---|---|
| 3,073,848 | 1/1963 | Wasson et al. | 260—347.4 |
| 3,076,818 | 2/1963 | Graham et al. | 260—346.2 |
| 3,201,422 | 8/1965 | Kaiser et al. | 260—346.2 |

ALEX MAZEL, Primary Examiner

B. J. DENTZ, Assistant Examiner

U.S. Cl. X.R.

260—346.2